United States Patent
Kuroki

(10) Patent No.: US 9,841,747 B2
(45) Date of Patent: Dec. 12, 2017

(54) NUMERICAL CONTROL DEVICE FOR PERFORMING CONTROL AXIS SWITCH

(71) Applicant: FANUC Corporation, Minamitsuru-gun, Yamanashi (JP)

(72) Inventor: Hideki Kuroki, Minamitsuru-gun (JP)

(73) Assignee: FANUC CORPORATION, Minamitsuru-gun, Yamanashi (JP)

(*) Notice: Subject to any disclaimer, the term of this patent is extended or adjusted under 35 U.S.C. 154(b) by 281 days.

(21) Appl. No.: 14/736,450

(22) Filed: Jun. 11, 2015

(65) Prior Publication Data

US 2015/0362906 A1    Dec. 17, 2015

(30) Foreign Application Priority Data

Jun. 12, 2014 (JP) .................... 2014-121647

(51) Int. Cl.
G05B 19/19      (2006.01)

(52) U.S. Cl.
CPC .. G05B 19/195 (2013.01); *G05B 2219/32105* (2013.01); *G05B 2219/34015* (2013.01)

(58) Field of Classification Search
CPC ........ G05B 19/195; G05B 2219/32105; G05B 2219/34015
USPC ........................................................ 700/114
See application file for complete search history.

(56) References Cited

U.S. PATENT DOCUMENTS

| | | | |
|---|---|---|---|
| 3,953,918 A | 5/1976 | Bone et al. | |
| 4,614,020 A | 9/1986 | Kawada et al. | |
| 5,795,278 A | 8/1998 | Saruwatari et al. | |
| 2002/0056933 A1* | 5/2002 | Kamiguchi | B29C 45/4005 264/40.1 |

(Continued)

FOREIGN PATENT DOCUMENTS

| | | |
|---|---|---|
| CN | 1521583 A | 8/2004 |
| CN | 1728029 A | 2/2006 |

(Continued)

OTHER PUBLICATIONS

Notification of Reasons for Refusal dated Oct. 13, 2015 in Japanese Patent Application No. 2014-121647 (5 pages) with an English Translation (6 pages).

(Continued)

*Primary Examiner* — Robert Fennema
*Assistant Examiner* — Jigneshkumar Patel
(74) *Attorney, Agent, or Firm* — Drinker Biddle & Reath LLP

(57) ABSTRACT

In a numerical control device for performing a control axis switch, each of a plurality of control axis units includes an axis movement amount conversion unit configured to convert a movement amount of a servo motor into a movement amount corresponding to each of the control axis units of the plurality of control axis units, an axis position data storage unit, and a control object axis position data storage unit configured to store an axis position of a control object at a time when the control object is separated from a single drive unit, and an axis position stored in the axis position data (Continued)

storage unit is configured to be updated by using the movement amount of the servo motor, regardless of whether or not the control object is connected by a control axis switch unit to the control axis unit.

3 Claims, 7 Drawing Sheets

(56) References Cited

U.S. PATENT DOCUMENTS

2002/0072813 A1* 6/2002 Ito .......................... G05B 19/27
                                                            700/56
2004/0158335 A1    8/2004 Fujibayashi et al.
2006/0017415 A1    1/2006 Kozai et al.

FOREIGN PATENT DOCUMENTS

| JP | S50-144976 A | 11/1975 |
| JP | S52-5072 A | 1/1977 |
| JP | S58-51046 A | 3/1983 |
| JP | H04-160603 A | 6/1992 |
| JP | H04-235610 A | 8/1992 |
| JP | H09-311706 A | 12/1997 |

OTHER PUBLICATIONS

Notification of the First Office Action dated Mar. 30, 2017 in Chinese Patent Application No. 2015103194094 (5 pages) with an English translation (7 pages).

* cited by examiner

NUMERICAL CONTROL DEVICE FOR PERFORMING CONTROL AXIS SWITCH

RELATED APPLICATION DATA

This application claims priority under 35 U.S.C. §119 and/or §365 to Japanese Application No. 2014-121647 filed Jun. 12, 2014, the entire contents is incorporated herein by reference.

BACKGROUND OF THE INVENTION

1. Field of the Invention

The present invention relates to a numerical control device for performing a control axis switch, and more particularly, to a numerical control device which has a configuration in which a single drive unit is provided for groups of a plurality control object units and a plurality of control axis units and the drive unit is connected thereto by a control axis switch unit as necessary, and enables the connection even in a structure in which the drive unit needs to be connected to each of the control object units at a specific position.

2. Description of the Related Art

When a plurality of control object parts are included in a machine tool, in many cases, each of the control object parts is driven by its dedicated drive source. In this case, there is a problem in that the machine weight is increased by the number of control objects and this causes an increase in cost.

In order to solve this problem, as the related art, a numerical control device in which a single drive unit is provided for groups of a plurality control object units and a plurality of control axis units and the single drive unit is connected to the desired control object unit and the control axis unit by a control axis switch unit as necessary is suggested in JP 09-311706 A.

In the numerical control device described in JP 09-311706 A, control is performed by changing the axis position of a servo motor at the time of reconnection to the control object unit to an axis position at the time of previous separation. Therefore, there is a problem in that connection between the servo motor and each of the control object units is limited to a structure in which connection can be achieved at an arbitrary axis position.

In addition, in the numerical control device described in JP 09-311706 A, when a control object is operated while the control object is not connected to an axis drive motor, a problem that a shift is generated between axis position data stored in each of axis control units and an actual position of a corresponding control object unit, cannot be solved.

SUMMARY OF THE INVENTION

Here, an object of the invention is to provide a numerical control device which has a configuration in which a single drive unit is provided for groups of a plurality control object units and a plurality of control axis units and the drive unit is connected to the desired control object unit and the control axis unit by a control axis switch unit as necessary, and performs control so as to enable the connection even in a structure in which the drive unit needs to be connected to each of the control object units at a specific position.

A numerical control device for performing a control axis switch in the invention includes: a plurality of control axis units to respectively control a plurality of control objects; and a control axis switch unit configured to transmit position commands of the plurality of control axis units to a single drive unit, in which the control axis switch unit transmits the position commands of the plurality of control axis units to the single drive unit so as to allow the plurality of control objects to be controlled and driven by the single drive unit, each of the plurality of control axis units includes an axis movement amount conversion unit configured to convert a movement amount of a servo motor output from a position detection unit provided in the single drive unit into a movement amount corresponding to each of the control axis units of the plurality of control axis units, an axis position data storage unit configured to store the movement amount converted by the axis movement amount conversion unit as a position of the control object, and a control object axis position data storage unit configured to store an axis position of the control object at a time when the control object is separated from the single drive unit, and an axis position to be stored in the axis position data storage unit is configured to be updated by using the movement amount of the servo motor output from the position detection unit, regardless of whether or not the control object is connected by the control axis switch unit to the control axis unit, so as to allow the single drive unit to be connected to the control object at a specific position during the control axis switch.

The position detection unit may be an absolute position detector configured to detect an absolute position of an axis position of the servomotor, and the control axis unit may detect an error of the position detection unit on the basis of the absolute position of the servo motor output from the position detection unit provided in the single drive unit and the axis position stored in the axis position data storage unit.

The plurality of control objects may respectively include absolute position detectors configured to detect absolute positions of the control objects, and the plurality of control axis units may sequentially update the axis positions stored in the control object axis position data storage units on the basis of the absolute positions output from the absolute position detectors provided in the plurality of control objects.

Since the invention has the above configurations, the numerical control device which has a configuration in which the single drive unit is provided for groups of the plurality control object units and the plurality of control axis units and the drive unit is connected to the desired control object unit and the control axis unit by a control axis switch unit as necessary, and performs control so as to enable the connection even in a structure in which the drive unit needs to be connected to each of the control object units at a specific position can be provided.

BRIEF DESCRIPTION OF THE DRAWINGS

The above and other objects and features of the invention will be more apparent from the following detailed description taken in conjunction with the accompanying drawings in which.

DETAILED DESCRIPTION OF THE PREFERRED EMBODIMENTS

First Embodiment

Figure 1:
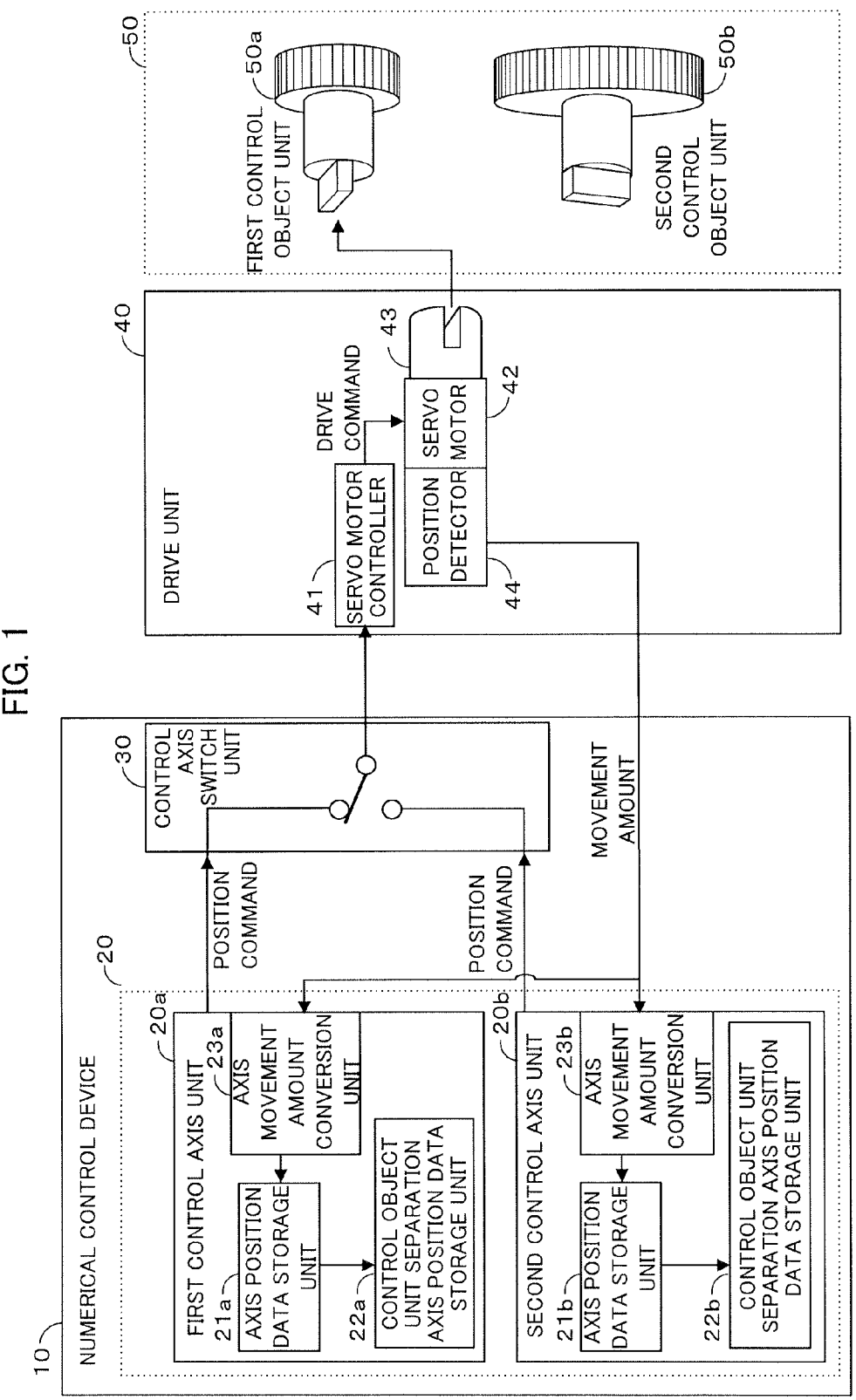
FIG. 1 is a block diagram of a numerical control device in a first embodiment of the invention.

FIG. 1 is a block diagram illustrating main parts of a numerical control device 10 in a first embodiment of the invention, and a drive unit 40 and control object units 50 which are controlled by the numerical control device 10. The numerical control device 10 includes a plurality of control axis units 20 and a control axis switch unit 30. Each of the control axis units 20 has a function of outputting a position command according to a command of a command program to the drive unit 40 so as to drive the control object unit 50 determined as a corresponding control object. In addition, each of the control axis units 20 includes an axis position data storage unit 21 which stores a conversion position obtained by converting the axis position of the drive unit 40 into the position of the control object unit 50 determined as the control object, a control object unit separation axis position data storage unit 22 which stores a conversion position of the drive unit 40 when the drive unit 40 is separated from the control object unit 50 determined as the control object, and an axis movement amount conversion unit 23 which converts the position of a servo motor 42 fed back from the drive unit 40 into the position of the control object unit 50 determined as the control object.

The control axis switch unit 30 has a function of switching the control axis units 20 and the control object units 50 for connection to the drive unit 40, connects the control axis unit 20 which controls the control object unit 50 to be driven by the command of the command program to the drive unit 40, and outputs the command to an axis switch device (not illustrated) to allow the servo motor 42 of the drive unit 40 to be connected to the control object unit 50 determined as the control object via a connection unit 43.

The drive unit 40 includes a servo motor controller 41, the servo motor 42, a position detector 44, and the connection unit 43. The servo motor controller 41 receives the position command from the control axis unit 20 connected to the control axis switch unit 30 and outputs a drive command so as to drive the servo motor 42. The connection unit 43 has a function of connecting the axis of the servomotor 42 to the control object unit 50 determined as the control object, and transmits power generated by driving the servo motor 42 to the control object unit 50. The position detector 44 feeds back the movement amount of the axis of the servo motor 42 into the control axis unit 20.

The control object unit 50 is a head, a table, or the like of a machine tool joined with a gear or a ball screw, and is configured to be driven by being connected to the drive unit 40 via the connection unit 43. In the system area of the numerical control device 10, the control axis unit 20 which forms a group with the corresponding control object unit 50 is prepared by a system program during the start-up of the numerical control device 10.

In this embodiment, devices to be controlled by the numerical control device 10 include a first control object unit 50a and a second control object unit 50b as the control object units 50, and a first control axis unit 20a and a second control axis unit 20b which respectively form groups with the corresponding control object units are operated in the numerical control device 10. In addition, in this embodiment, a structure in which the first control object unit 50a, the second control object unit 50b, and the connection unit 43 of the servomotor 42 are provided with cutouts and the servomotor 42 and each of the control object units 50 have to be connected to each other at a specific axis position is employed. Furthermore, an axis movement amount conversion unit 23a provided in the first control axis unit 20a stores an axis movement amount conversion factor $K_1$ for converting the axis movement amount of the servo motor 42 into the movement amount of the first control object unit 50a, and an axis movement amount conversion unit 23b provided in the second control axis unit 20b stores an axis movement amount conversion factor $K_2$ for converting the axis movement amount of the servo motor 42 into the movement amount of the second control object unit 50b.

In the numerical control device 10 having the above configuration, when a command for connection to the first control object unit 50a is output by the command program, the control axis switch unit 30 connects the first control axis unit 20a to the drive unit 40 and connects the drive unit 40 to the first control object unit 50a. When the connection between the units is achieved, the position command is output from the first control axis unit 20a to the servo motor controller 41 according to the command program, and the servo motor 42 is driven by the drive command which is output according to the position command. As the servo motor 42 is driven, power is transmitted to the first control object unit 50a via the connection unit 43 such that the first control object unit 50a is moved to a commanded position. At this time, the position detector 44 feeds back the movement amount of the axis position of the servo motor 42 into the first control axis unit 20a, and the position detector 44 also feeds back the movement amount of the axis position of the servo motor 42 to the second control axis unit 20b which is not connected to the drive unit 40.

The axis movement amount conversion unit 23a provided in the first control axis unit 20a and the axis movement amount conversion unit 23b provided in the second control axis unit 20b respectively convert the movement amounts fed back from the position detector 44 into the control axis units 20 into movement amounts of the control object units 50a and 50b determined as the control objects. For example, when the movement amount of the axis position of the servomotor 42 which is output from the position detector 44 is represented by $\phi$, the axis movement amount conversion unit 23a provided in the first control axis unit 20a outputs a conversion amount $K_1\phi$, and the axis movement amount conversion unit 23b provided in the second control axis unit 20b outputs a conversion amount $K_2\phi$. In addition, the first control axis unit 20a adds the conversion amount $K_1\phi$ output from the axis movement amount conversion unit 23a to position data stored in an axis position data storage unit 21a, and thus stores the current position of the control object units 50a. In addition, the second control axis unit 20b adds the conversion amount $K_2\phi$ output from the axis movement amount conversion unit 23b to position data stored in an axis position data storage unit 21b, and thus stores a position to which the second control object unit 50b is moved when it is assumed that the drive unit 40 is connected to the second control object unit 50b.

In this state, when a control axis switch command is output by the command program, the control axis switch unit 30 separates the first control axis unit 20a from the drive unit 40 and separates the drive unit 40 from the first control object unit 50a. At this time, the first control axis unit 20a acquires the position data of the first control object unit 50a stored in the axis position data storage unit 21a at the time of the separation, and stores the position data in a control object unit separation axis position data storage unit 22a. Thereafter, the control axis switch unit 30 connects the second control axis unit 20b to the drive unit 40. However, before connecting the drive unit 40 to the second control object unit 50b, with reference to the axis position data storage unit 21b and a control object unit separation axis position data storage unit 22b which are provided in the second control axis unit 20b, the difference between the position of the second control object unit 50b determined when the drive unit 40 and the second control object unit 50b are separated from each other and the position of the drive unit 40 with respect to the second control object unit 50b is calculated. In addition, the second control axis unit 20b outputs a position command, and the axis position of the servo motor 42 with respect to the second control object unit 50b is moved to the position of the second control object unit 50b determined when the drive unit 40 and the second control object unit 50b are separated from each other. Here, even during the movement for axis position adjustment, the movement amount is fed back from the position detector 44 into the control axis unit 20, and the axis position data stored in the first axis position data storage unit 21a and the second axis position data storage unit 21b is updated.

In addition, at a time when the cutouts of the connection unit 43 and the second control object unit 50b are moved to a position where the cutouts are engaged with each other, the control axis switch unit 30 connects the drive unit 40 to the second control object unit 50b, and the second control axis unit 20b performs control of the second control object unit 50b according to the command program.

Figure 2:
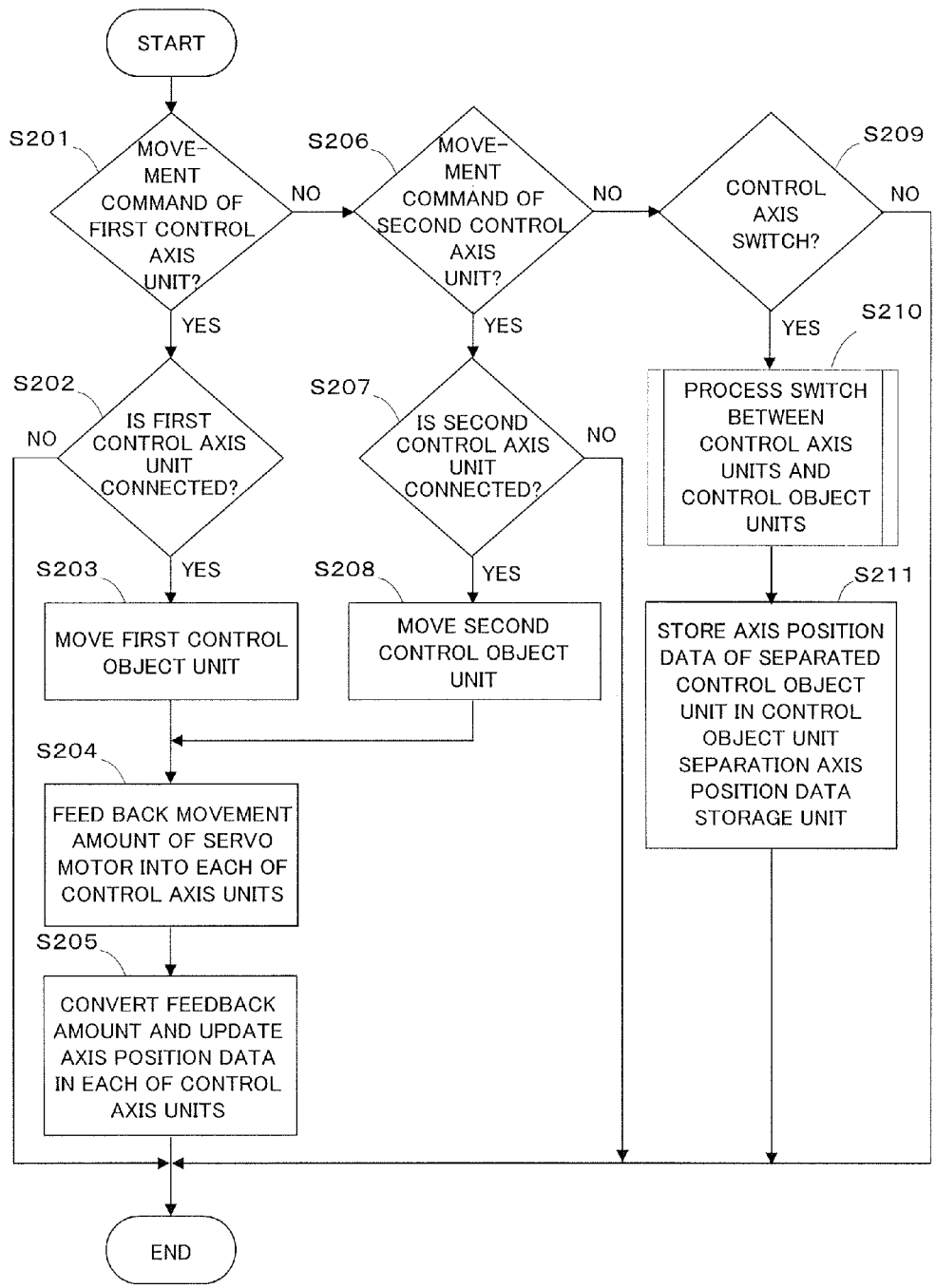
FIG. 2 is a flowchart of a control process in the first embodiment of the invention.

FIG. 2 is a flowchart illustrating a process order when the numerical control device 10 in this embodiment processes command blocks of the command program.

The numerical control device 10 reads a command block from the command program, and determines whether or not the command of the command block is a movement command of the first control axis unit 20a (S201). When the command determined in S201 is the movement command of the first control axis unit 20a, it is determined whether or not the first control axis unit 20a is currently connected to the drive unit 40 (S202).

In S202, when the first control axis unit 20a is not connected to the drive unit 40, the command cannot be executed, and thus the process of the command block is ended. In S202, when it is determined that the first control axis unit 20a is connected to the drive unit 40, the first control object unit 50a is moved on the basis of the command of the command block (S203).

When the first control object unit 50a is moved, the movement amount of the servo motor 42 is fed back from the position detector 44 into the first control axis unit 20a and the second control axis unit 20b (S204). Therefore, the axis movement amount conversion unit 23a provided in the first control axis unit 20a and the axis movement amount conversion unit 23b provided in the second control axis unit 20b respectively add the axis movement amount conversion factors $K_1$ and $K_2$ of the control object units 50a and 50b which are respectively controlled by the control axis units to the movement amount of the servo motor 42 which is fed back, and add the addition results to the axis position data storage units 21a and 21b so as to update the corresponding the axis position data (S205). Thereafter, the process of the command block is ended.

When the command determined in S201 is not the movement command of the first control axis unit 20a, subsequently, it is determined whether or not the command is a movement command of the second control axis unit 20b (S206). When the command determined in S206 is the movement command of the second control axis unit 20b, it is determined whether or not the second control axis unit 20b is currently connected to the drive unit 40 (S207).

In S207, when the second control axis unit 20b is not connected to the drive unit 40, the command cannot be executed, and thus the process of the command block is ended. In S207, when it is determined that the second control axis unit 20b is connected to the drive unit 40, the second control object unit 50b is moved on the basis of the command of the command block (S208). Thereafter, in the same manner as in S204 and S205, the axis position data is updated, and then the process of the command block is ended.

When the command determined in S206 is not the movement command of the second control axis unit 20b, subsequently, it is determined whether or not the command is a command of a control axis switch (S209). When the command determined in S209 is the command of the control axis switch, the control axis switch unit 30 separates the drive unit 40 from the control axis unit 20 and the control object unit 50 which are currently connected to the drive unit 40, and then connects the drive unit 40 to the control axis unit 20 determined as a switch destination and the control object unit 50 determined as a switch destination (S210). At this time, before connecting the drive unit 40 to the control axis unit 20 determined as the switch destination and the control object unit 50 determined as the switch destination, on the basis of the values of the axis position data stored in the axis position data storage unit 21 of the control object unit 50 to be connected by the switch and the axis position data stored in the control object unit separation axis position data storage unit 22 of the control object unit 50 to be connected by the switch, a control process of returning the axis position of the servo motor to an axis position determined when the control object unit 50 and the drive unit 40 are separated from each other in the preceding process is performed, and the axis position data stored in the axis position data storage unit 21 of each of the control axis units 20 is updated on the basis of the movement amount which is fed back according to the movement. Thereafter, the drive unit 40 is connected to the control axis unit 20 and the control object unit 50 to be connected by the switch.

In addition, the axis position data of the separated control object unit 50 at the time of the separation is acquired by the axis position data storage unit 21 of the separated control axis unit 20, and is stored in the control object unit separation axis position data storage unit 22 of the separated control axis unit 20 (S211).

As described above, in this embodiment, the axis position data storage unit 21 provided in the control axis unit 20 which is connected to the drive unit 40 is updated and the axis position data storage unit 21 provided in the control axis unit 20 which is not connected to the drive unit 40 is updated, and thus the position of the drive unit 40 with respect to each of the control object units 50 can be recognized. Therefore, even in a case where the connection unit 43, which has to be connected at a specific position, is provided, a switch of the control axis can be easily performed.

Second Embodiment

This embodiment is significantly different from the first embodiment in that an absolute position detector is used as the position detector of the servo motor. In this embodiment, whether or not the feedback of the movement amount from the absolute position detector is damaged can be detected by whether or not the axis position data of the control axis unit updated by converting the movement amount of the servo motor acquired by the absolute position detector coincides with the axis position of the control axis unit converted from absolute position data.

Figure 3:
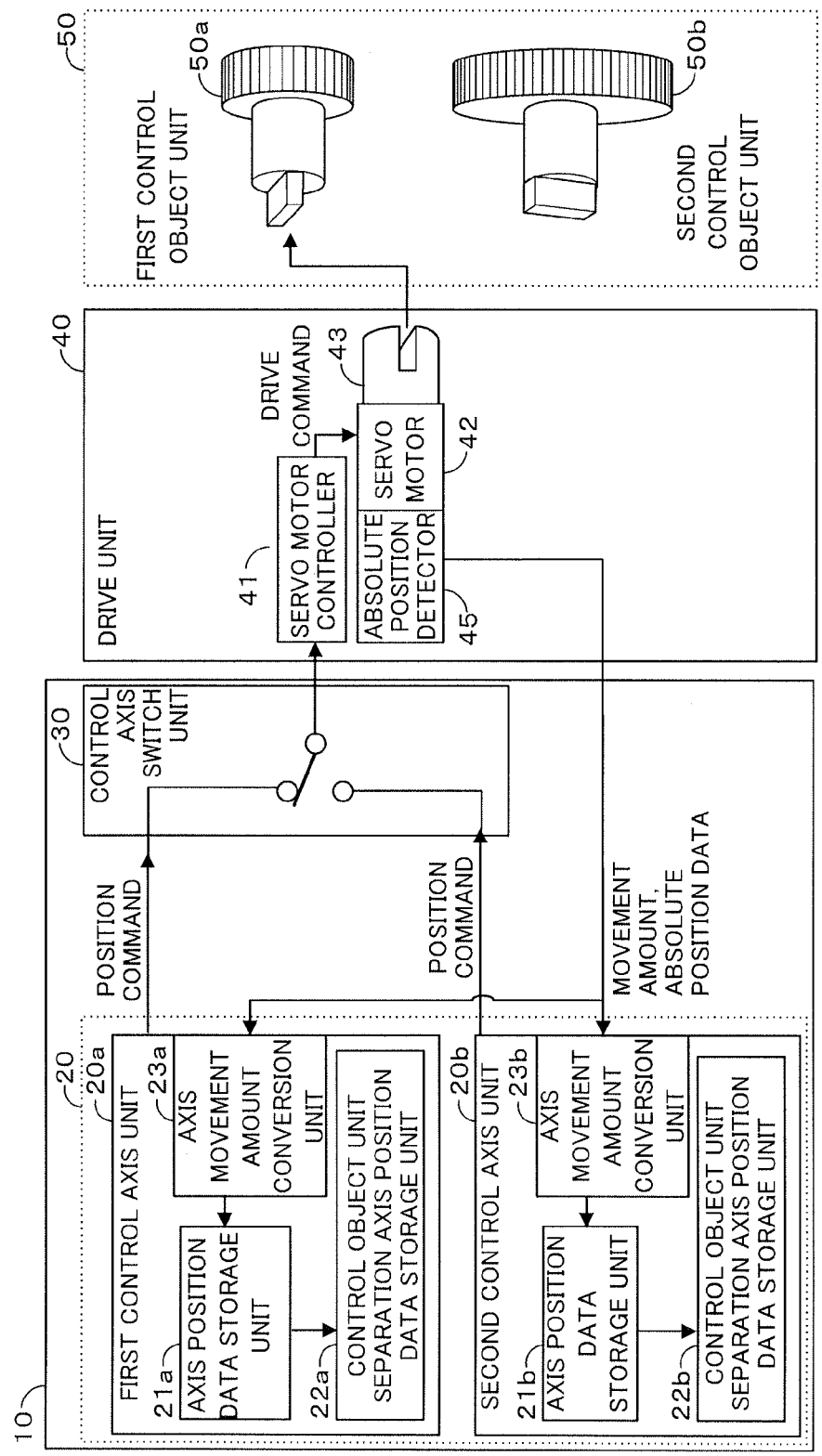
FIG. 3 is a block diagram of a numerical control device in a second embodiment of the invention.

FIG. 3 is a block diagram illustrating main parts of the numerical control device 10 according to this embodiment, and the drive unit 40 and the control object units 50 which are controlled by the numerical control device 10. In this embodiment, instead of the position detector 44 of the first embodiment, an absolute position detector 45 is used as a detector which detects the axis position of the servo motor 42. The absolute position data of the servo motor 42 in addition to the movement amount is fed back from the absolute position detector 45 into the first control axis unit 20a and the second control axis unit 20b.

Figure 4:
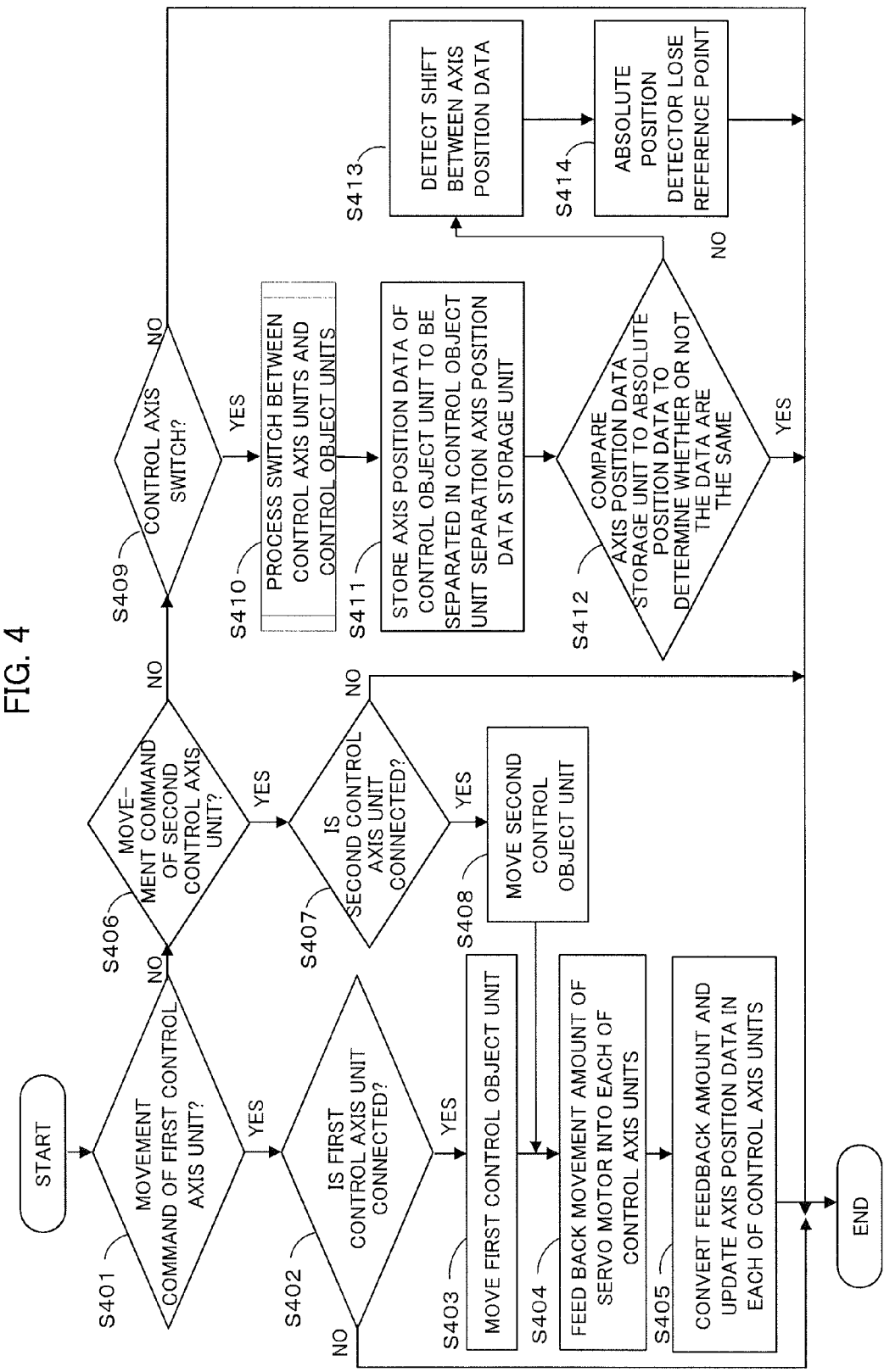
FIG. 4 is a flowchart of a control process in the second embodiment of the invention.

A process order when the numerical control device 10 having the above configuration processes command blocks of the command program will be described with reference to the flowchart of FIG. 4.

Processes (S401 to S405) for the movement command of the first control axis unit, processes (S406 to S408, S404, and S405) for the movement command of the second control axis unit, and control axis switch processes (S409 to S411) performed under a control axis switch command in this embodiment are the same as the processes (S201 to S205) for the movement command of the first control axis unit, the processes (S206 to S208, S204, and S205) for the movement command of the second control axis unit, and the control axis switch processes (S209 to S211) performed under the control axis switch command in the first embodiment described with reference to FIG. 2.

When the process of storing the axis position data in the control object unit separation axis position data storage unit in S411 is ended, the numerical control device 10 of this embodiment compares the axis position data stored in the axis position data storage unit with the axis position data of the control axis converted from the absolute position data acquired by the absolute position detector (S412). In addition, when the comparison results in S412 are equal to each other, the process of the command block is ended. However, when the comparison results in S412 are different from each other, a shift between the axis position data is detected (S413), and the absolute position detector 45 outputs a signal of the loss of the reference point as an alarm (S414).

As described above, in this embodiment, since the axis position data storage unit of the control axis unit updated from the movement amount acquired by the absolute position detector is compared to the absolute position data, a case where the feedback of the movement amount from the absolute position detector is damaged due to disconnection or the like and thus the feedback having an inaccurate value can be detected.

Third Embodiment

This embodiment is different from the first embodiment in that the absolute position detector is provided in each of the control object units. In this embodiment, the position of the control object unit is calculated from the absolute position data acquired by the absolute position detector provided in each of the control object units. Accordingly, the position stored in the axis position data storage unit of the control axis unit can be updated to the current position of the control object unit.

Figure 5:
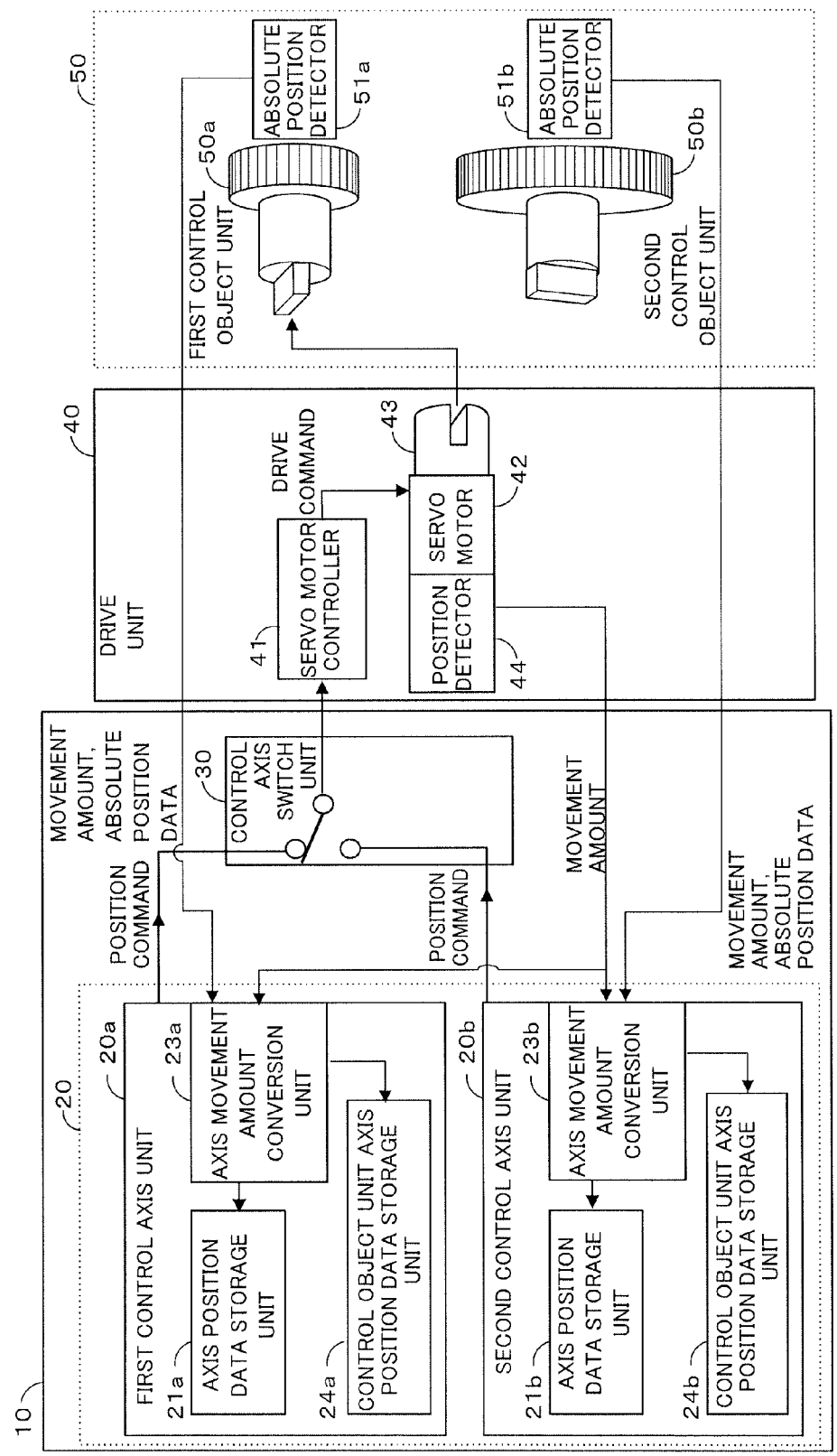
FIG. 5 is a block diagram of a numerical control device in a third embodiment of the invention.

FIG. 5 is a block diagram illustrating main parts of the numerical control device 10 according to this embodiment, and the drive unit 40 and the control object units 50 which are controlled by the numerical control device 10. In this embodiment, absolute position detectors 51a and 51b are respectively provided in the first control object unit 50a and the second control object unit 50b. The movement amount and the absolute position data of the first control object unit 50a are fed back from the absolute position detector 51a into the first control axis unit 20a, and the movement amount and the absolute position data of the second control object unit 50b are fed back from the absolute position detector 51b into the second control axis unit 20b.

In addition, the control axis units 20a and 20b respectively include control object unit axis position data storage units 24a and 24b instead of the control object unit separation axis position data storage units 22a and 22b. The control object unit axis position data storage units 24a and 24b respectively store the axis positions of the control object units determined as the control objects by the control axis units.

In this embodiment, the absolute position data of the control object units 50a and 50b fed back from the absolute position detectors 51a and 51b are respectively stored in the control object unit axis position data storage units 24a and 24b of the control axis units 20a and 20b. In addition, in the control axis unit which is not connected to the drive unit 40 by the control axis switch unit 30, the axis movement amount conversion unit converts the movement amount fed back from the position detector 44 into the movement amount of the control object unit determined as the control object by the control axis unit, and the axis position data storage unit of the control axis unit is updated by the converted movement amount. However, in the control axis unit which is connected to the drive unit 40 by the control axis switch unit 30, the axis position data storage unit of the control axis unit is updated on the basis of the movement amount fed back from the absolute position detector provided in the control object unit determined as the control object by the control axis unit. The axis movement amount conversion units 23a and 23b which are respectively provided in the control axis units 20a and 20b determine whether to use the movement amount fed back from the position detector 44 or the movement amounts fed back from the absolute position detectors 51a and 51b for updating the axis position data storage units.

Figure 6:
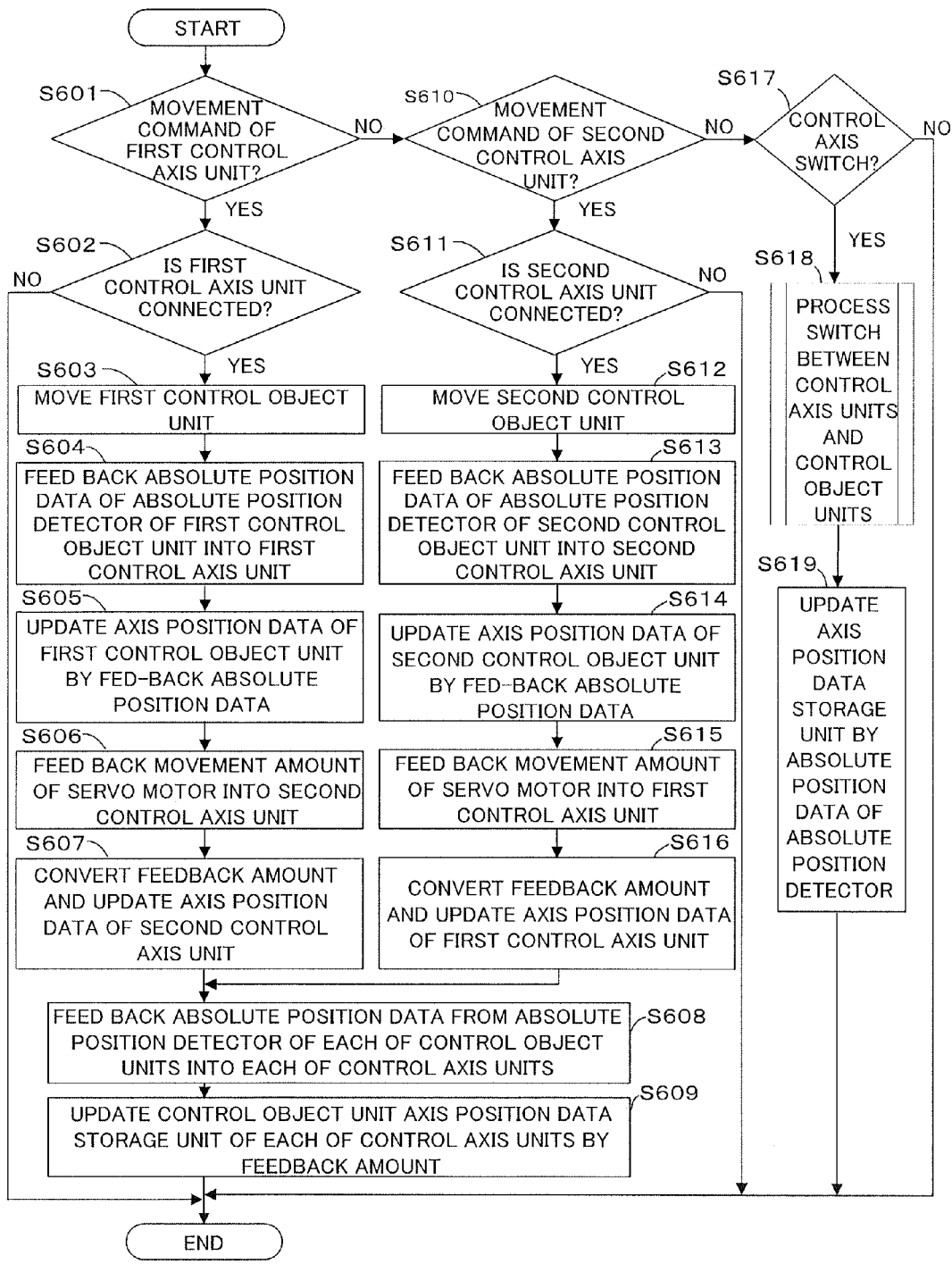
FIG. 6 is a flowchart of a control process in the third embodiment of the invention.

A process order when the numerical control device 10 having the above configuration processes command blocks of the command program will be described with reference to the flowchart of FIG. 6.

The numerical control device 10 reads a command block from the command program, and determines whether or not the command of the command block is a movement command of the first control axis unit 20a (S601). When the command determined in S601 is the movement command of the first control axis unit 20a, it is determined whether or not the first control axis unit 20a is currently connected to the drive unit 40 (S602).

In S602, when the first control axis unit 20a is not connected to the drive unit 40, the command cannot be executed, and thus the process of the command block is ended. In S602, when it is determined that the first control axis unit 20a is connected to the drive unit 40, the first control object unit 50a is moved on the basis of the command of the command block (S603).

The movement amount of the absolute position detector 51a obtained when the first control object unit 50a is moved is fed back into the first control axis unit 20*a* (S604). The axis movement amount conversion unit 23*a* provided in the first control axis unit 20*a* updates the value of the axis position data storage unit 21*a* of the first control object unit 50*a* on the basis of the movement amount of the first control object unit 50*a* which is fed back (S605). Subsequently, the movement amount of the servo motor 42 obtained when the first control object unit 50*a* is moved is fed back from the position detector 44 into the second control axis unit 20*b* (S606). Therefore, the axis movement amount conversion unit 23*b* provided in the second control axis unit 20*b* adds the axis movement amount conversion factor $K_2$ of the second control object unit 50*b* to the movement amount of the servo motor 42 which is fed back, and adds the addition result to the axis position data storage unit 21*b* so as to update the axis position data (S607).

Finally, the absolute position data of the control object units 50*a* and 50*b* are respectively fed back from the absolute position detectors 51*a* and 51*b* provided in the control object units 50*a* and 50*b* into the control axis units 20*a* and 20*b* (S608), and the control axis units 20*a* and 20*b* respectively update the values of the control object unit axis position data storage units 24*a* and 24*b* according to the fed-back absolute position data of the control object units 50*a* and 50*b* determined as the control objects (S609). Thereafter, the process of the command block is ended.

When the command determined in S601 is not the movement command of the first control axis unit 20*a*, subsequently, it is determined whether or not the command is a movement command of the second control axis unit 20*b* (S610). When the command determined in S610 is the movement command of the second control axis unit 20*b*, it is determined whether or not the second control axis unit 20*b* is currently connected to the drive unit 40 (S611).

In S611, when it is determined that the second control axis unit 20*b* is not connected to the drive unit 40, the command cannot be executed, and thus the process of the command block is ended. In S611, when it is determined that the second control axis unit 20*b* is connected to the drive unit 40, the second control object unit 50*b* is moved on the basis of the command of the command block (S612).

The movement amount of the absolute position detector 51*b* obtained when the second control object unit 50*b* is moved is fed back into the second control axis unit 20*b* (S613). The axis movement amount conversion unit 23*b* provided in the second control axis unit 20*b* updates the value of the axis position data storage unit 21*b* of the second control object unit 50*b* on the basis of the movement amount of the second control object unit 50*b* which is fed back (S614). Subsequently, the movement amount of the servo motor 42 obtained when the second control object unit 50*b* is moved is fed back from the position detector 44 into the first control axis unit 20*a* (S615). Therefore, the axis movement amount conversion unit 23*a* provided in the first control axis unit 20*a* adds the axis movement amount conversion factor $K_1$ of the control object unit 50*a* to the movement amount of the servo motor 42 which is fed back, and adds the addition result to the axis position data storage unit 21*a* so as to update the axis position data (S616). Thereafter, in the same manner as in S608 and S609, each of the control object unit axis position data storage units 24*a* and 24*b* is updated, and then the process of the command block is ended.

When the command determined in S610 is not the movement command of the second control axis unit 20*b*, subsequently, it is determined whether or not the command is a command of the control axis switch (S617). When the command determined in S617 is the command of the control axis switch, the control axis switch unit 30 separates the drive unit 40 from the control axis unit 20 and the control object unit 50 which are currently connected to the drive unit 40, and then connects the drive unit 40 to the control axis unit 20 determined as a switch destination and the control object unit 50 determined as a switch destination (S618). At this time, before connecting the drive unit 40 to the control axis unit 20 determined as the switch destination and the control object unit 50 determined as the switch destination, on the basis of the values of the axis position data stored in the axis position data storage unit 21 of the control object unit 50 to be connected by the switch and the axis position data stored in the control object unit axis position data storage unit of the control object unit 50 to be connected by the switch, a control process of returning the axis position of the servo motor to a current axis position of the control object unit 50 is performed, and the axis position data stored in the axis position data storage unit 21 of each of the control axis units 20 is updated on the basis of the movement amount which is fed back from the position detector 44 according to the movement. Thereafter, the drive unit 40 is connected to the control axis unit 20 and the control object unit 50 to be connected by the switch.

In addition, the value of the axis position data storage unit of the connected control axis unit 20 is updated by the absolute position data fed back from the absolute position detector 51 of the control object unit 50 determined as the control object by the control axis unit (S619).

In this embodiment, the absolute position data of the control object unit 50 is always fed back from the control object unit 50 which is not connected to the drive unit 40, and thus this embodiment is effective in a case where the control object unit 50 is moved while being separated from the drive unit 40 due to some causes other than the drive unit 40.

Other Embodiments

In the embodiments described hereinabove, an example in which the first control object unit 50*a* and the second control object unit 50*b* are moved independently from each other is described. However, the axis control method of the invention can be applied even in a case where the first control object unit 50*a* and the second control object unit 50*b* are simultaneously operated.

Figure 7:
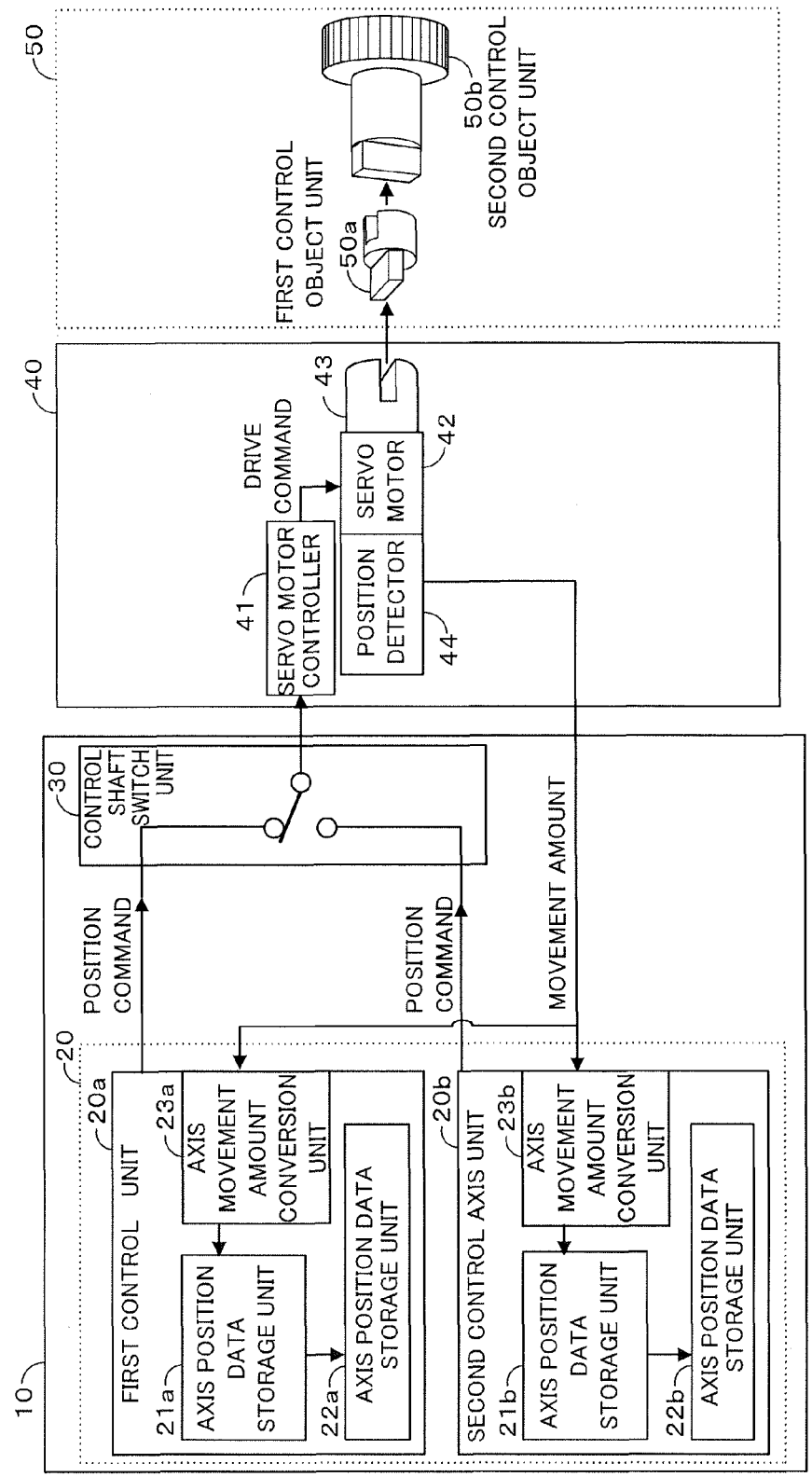
FIG. 7 is a block diagram of a numerical control device in another embodiment of the invention.

FIG. 7 illustrates an example in which the second control object unit 50*b* and the drive unit 40 are connected to each other via the first control object unit 50*a*.

In this embodiment, when only the first control object unit 50*a* is controlled to be operated by the control axis switch unit 30, the servo motor 42 is driven in a state where the connection unit 43 and the first control object unit 50*a* are connected to each other and the first control object unit 50*a* and the second control object unit 50*b* are separated from each other, and only a control object which meshes with the gear (not illustrated) of the first control object unit 50*a* is moved. In addition, when the first control object unit 50*a* and the second control object unit 50*b* are controlled to be operated by the control axis switch unit 30, the servo motor 42 is driven in a state where the connection unit 43 and the first control object unit 50*a* are connected to each other and the first control object unit 50*a* and the second control object unit 50*b* are connected to each other, and both the control object which meshes with the gear (not illustrated) of the first control object unit 50*a* and a control object which meshes with the gear of the second control object unit 50*b* are moved.

Even in this configuration, by appropriately managing the values of the axis position data storage unit 21*b* and the control object unit separation axis position data storage unit 22*b* of the second control axis unit 20*b*, the same effect as that of the other embodiments can be obtained.

The invention claimed is:

1. A numerical control device, comprising:
    a plurality of control axis units configured to respectively control a plurality of control objects; and
    a control axis switch unit configured to transmit position commands of the plurality of control axis units to a single drive unit, wherein
    the control axis switch unit is configured to transmit the position commands of the plurality of control axis units to the single drive unit so as to allow the plurality of control objects to be controlled and driven by the single drive unit,
    each of the plurality of control axis units comprises:
        an axis movement amount conversion unit configured to convert a movement amount of a servo motor output from a position detection unit provided in the single drive unit into a movement amount corresponding to each of the control axis units of the plurality of control axis units;
        an axis position data storage unit configured to store the movement amount converted by the axis movement amount conversion unit as a position of the control object; and
        a control object axis position data storage unit configured to store an axis position of the control object at a time when the control object is separated from the single drive unit, and
    each of the plurality of control axis units updates the axis position data storage unit with the movement amount of the servo motor output from the position detection unit, regardless of whether or not the control axis unit is connected by the control axis switch unit to the control object, so that the position of the single drive unit is moved to the position that can be connected to the control object on the basis of the position of the control object stored in the position data storage unit and the axis position stored in the control object axis position data storage unit at the time when the control axis is switched so as to allow the single drive unit to be connected to the control object at a specific position during the control axis switch.

2. The numerical control device according to claim 1, wherein the position detection unit is an absolute position detector configured to detect an absolute position of an axis position of the servo motor, and
    the control axis unit is configured to detect an error of the position detection unit on the basis of the absolute position of the servo motor output from the position detection unit provided in the single drive unit and the axis position stored in the axis position data storage unit.

3. The numerical control device according to claim 1, wherein the plurality of control objects respectively include absolute position detectors configured to detect absolute positions of the control objects, and
    the plurality of control axis units are configured to sequentially update the control object axis position data storage unit on the basis of the absolute positions output from the absolute position detectors provided in the plurality of control objects.

* * * * *